May 24, 1927. 1,629,996
H. DEIDERS
RAIL BUTT CONNECTION WITH FISHPLATE
Filed Jan. 21, 1925
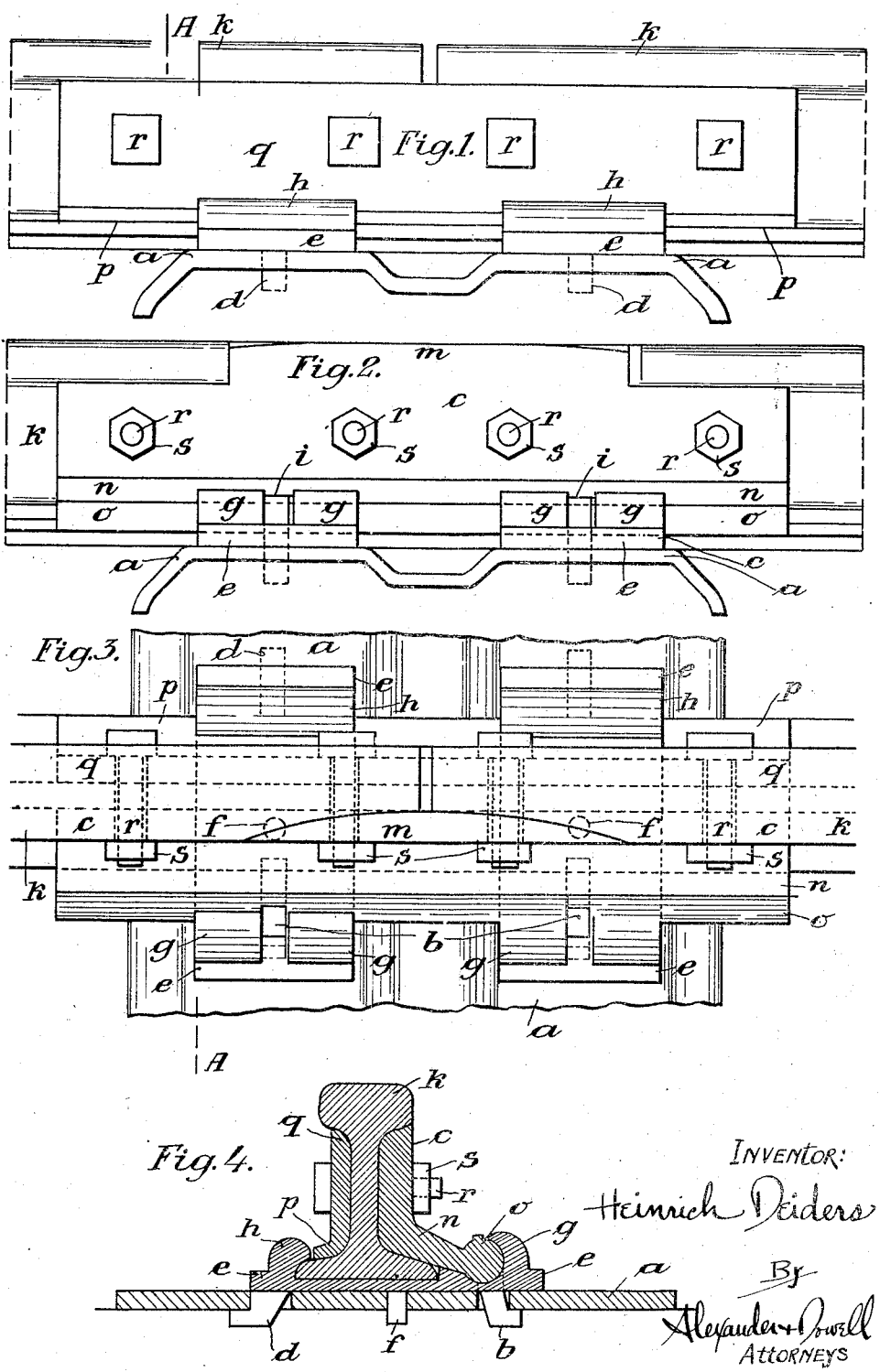

Patented May 24, 1927.

1,629,996

UNITED STATES PATENT OFFICE.

HEINRICH DEIDERS, OF HELMSTEDT, GERMANY.

RAIL-BUTT CONNECTION WITH FISHPLATE.

Application filed January 21, 1925, Serial No. 3,750, and in Germany January 5, 1923.

The object of the invention is a rail-butt-connection with angle shaped inside fish plate the lower angle limb of which is secured so as to revolve in a hook on the base plate and engages below with hook lugs the sleeper cover, whereby the butt connection is tightened up more closely on itself and with the sleepers than with the usual fish plates.

The drawing shows an embodiment of the rail-butt-connection in which

Fig. 1 is a side view from the outside,

Fig. 2 is a side view from the inside,

Fig. 3 is a top view and

Fig. 4 is a section through A—A in Figs. 1 to 3.

The rail-butt lies on an iron double sleeper $a$ or two butt-sleepers with holes which have the two usual openings to receive the hooks $b$ of the angled or L-shaped fish plate $c$ and the outer hooks $d$ of the base plate $e$. The sleeper has moreover a further opening for the bolts of the base plate $e$, which lies as usual upon the sleeper $a$ and base plate $e$ is provided on the inside with hooks $g$ and on the outside with a hook $h$. Between the inner hooks $g$ a gap $i$ is provided through which the hook lug $b$ passes to engage the sleeper $a$. Upon the base plates lie in the usual way the ends of the rails $k$ which have on the inside a flat, curved or arcuate shaped recess or gap to take the head $m$ of the inner fish plate $c$, which is flush with the top of the rail $k$ as shown in Fig. 2. The lower angle leg $n$ of the inner fish plate ends in a rib $o$. The foot $p$ of the outer fish plate $q$ has gaps to take the hooks $h$ of the base plate $e$.

How the rail-butt-connection works is best seen if a description is given of how it is built up. First of all the two hook plates $e$ are placed on the double sleepers $a$ while the hook $d$ is guided through the corresponding opening of the sleeper cover.

The bolt $f$ then engages in the corresponding hole in the sleeper. Now the rail ends are introduced into the base plate in such a way that the distance between the rail-ends allows for the expansion and contraction of the rails due to changes in temperature from time to time. Then the outer fish plate $q$ is applied, and also the inner fish plate, the latter's two hooks $b$ being guided through the corresponding openings in the base plate $e$ and the double sleeper $a$. The inner L-shaped fish plate $c$ is then screwed up to the outer fish plate $q$ in the usual way by the bolts $r$ with the nuts $s$. By tightening the nuts the fish plates are pressed against the rail and the hooks $b$ situated on the fish plate foot $n$ are pressed under the sleeper covers whereby the rail-butt-connection is tightened up on itself and with the sleeper.

If timber is used in place of iron sleepers in the superstructure it must at the places for receiving the hooks and lugs be provided with suitable bored iron plates.

I claim:

1. In a rail-butt connection, a base plate having a hook on its upper side and an L-shaped fish plate having an extension on its vertical leg flush with the top surface of the rail, the horizontal leg of the fish plate having a rounded rib on its outer edge pivotally engaging said hook.

2. In a combination as set forth in claim 1, a sleeper having rows of perforations; hooks on the under side of the base plate adapted to lock in one row of said perforations; and opposed hooks on the outer edge of the horizontal leg of the fish plate adapted to pass through openings in the base plate and to lock in the other row of perforations in said sleeper.

3. In a rail-butt connection, a base plate having a hook on its upper side; an L-shaped fish plate having its vertical leg flush with the top surface of the rails, the outer edge of the horizontal leg engaging said hook; a sleeper having rows of perforations; hooks on the under side of the base plate adapted to lock in one row of said perforations; and opposed hooks on the edge of the horizontal leg of the fish plate adapted to pass through openings in the base plate and to lock in the other row of perforations in said sleeper.

4. In a rail-butt connection having a recess in the side edge of the abutting ends of the rails; a base plate having a rounded hook on its upper side; an L-shaped fish plate having an extension on its vertical leg adapted to fit said recess, the upper end of said extension being flush with the top surface of the rail; the outer edge of the horizontal leg of the fish plate having a rounded rib pivotally engaging the said rounded hook.

5. In a combination as set forth in claim 4; a sleeper having rows of perforations; hooks on the under side of the base plate adapted to lock in one row of said perforations; and opposed hooks on the outer edge of the horizontal leg of the fish plate adapted to pass through openings in the base plate and to lock in the other row of perforations in said sleeper.

H. DEIDERS.